Nov. 11, 1952     E. A. WAGNER     2,617,628
UTILITY VEHICLE WITH TILTING LIFT FRAME
Filed Dec. 26, 1947     2 SHEETS—SHEET 1
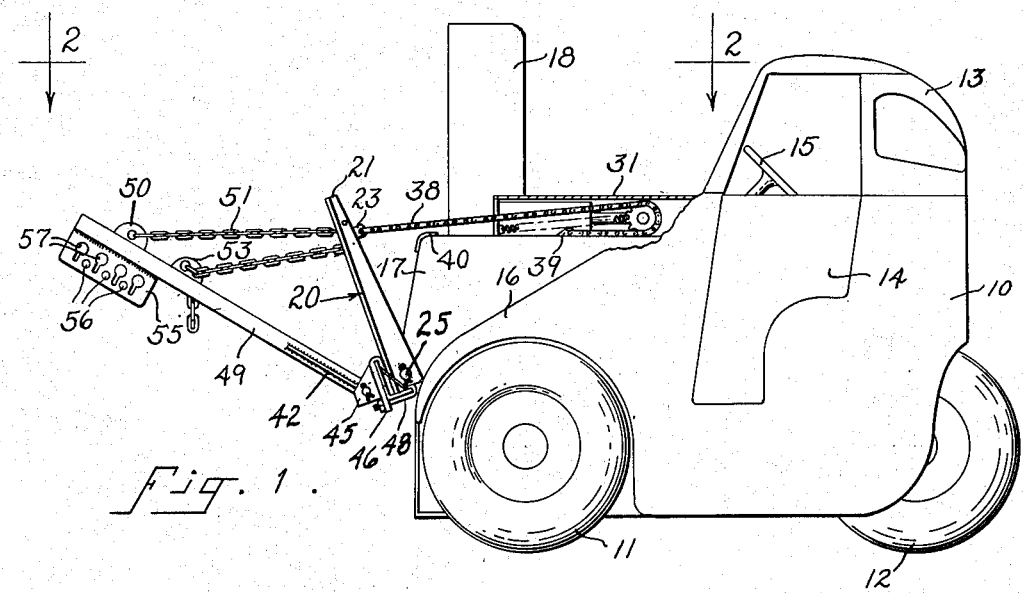
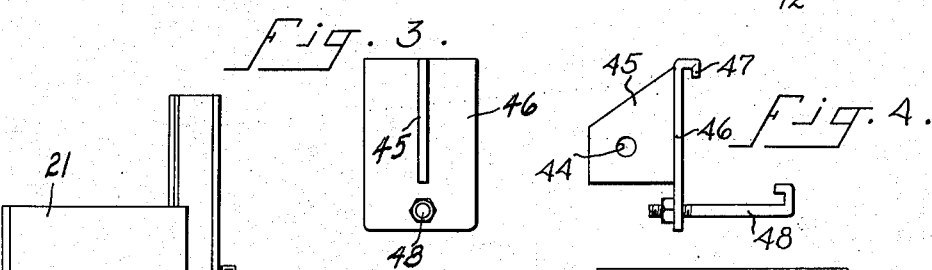
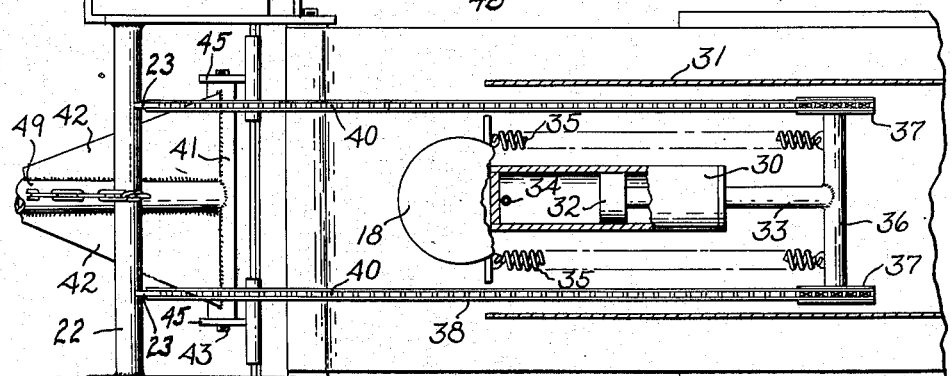
INVENTOR.
Elmer A. Wagner
BY
Attorney Nov. 11, 1952      E. A. WAGNER      2,617,628
UTILITY VEHICLE WITH TILTING LIFT FRAME
Filed Dec. 26, 1947      2 SHEETS—SHEET 2
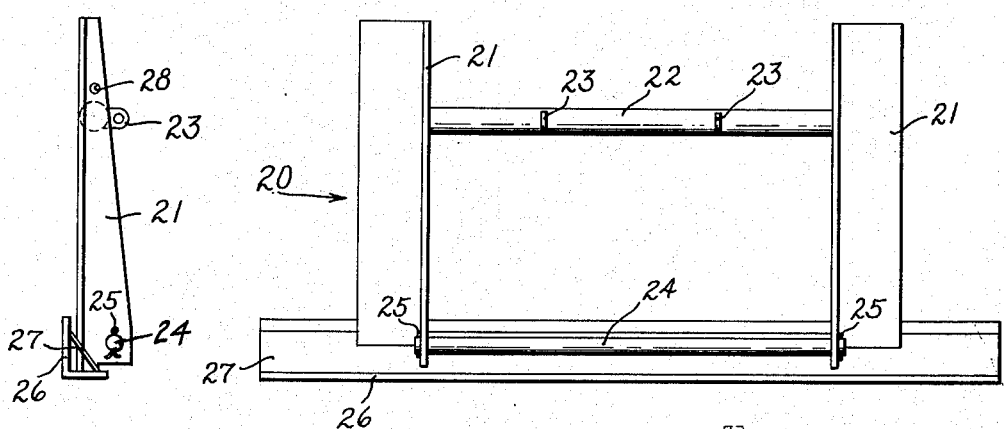
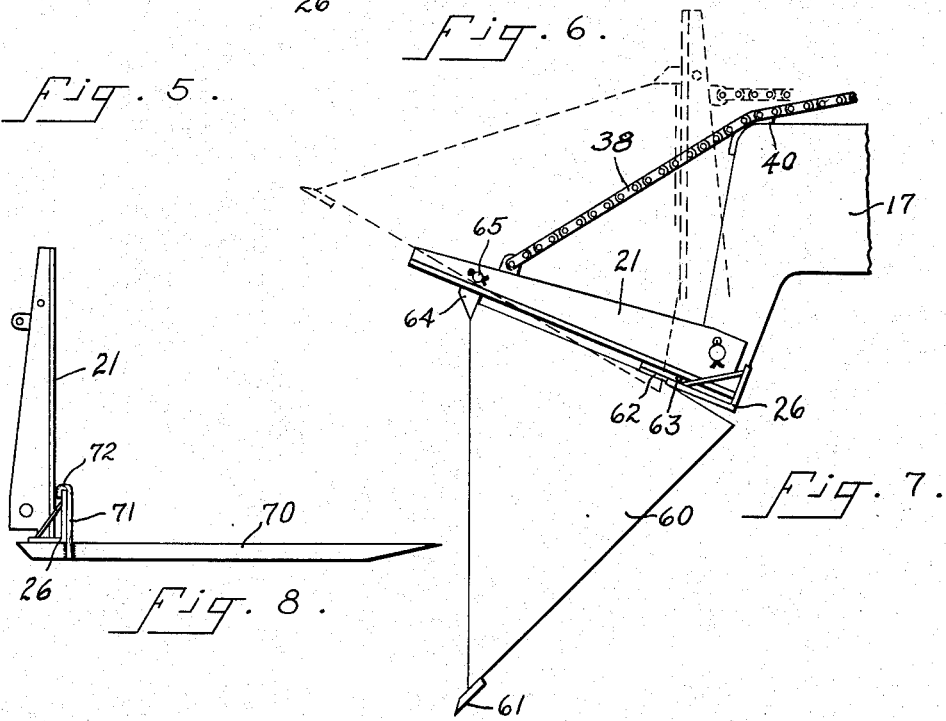
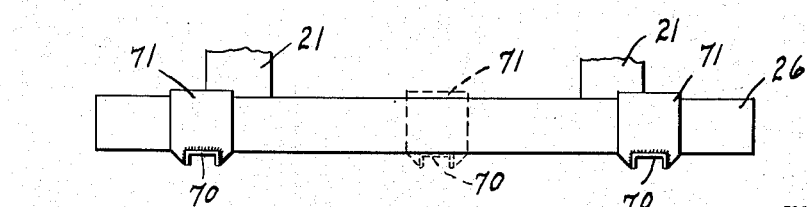
INVENTOR.
Elmer A. Wagner
BY
Attorney Patented Nov. 11, 1952

2,617,628

UNITED STATES PATENT OFFICE 2,617,628

UTILITY VEHICLE WITH TILTING LIFT FRAME

Elmer A. Wagner, Portland, Oreg.

Application December 26, 1947, Serial No. 794,066

4 Claims. (Cl. 254—127)

My present invention relates to a utility vehicle and particularly to the material handling portion thereof. The invention is of special utility in connection with a utility vehicle such as described and claimed in my co-pending application, Serial No. 756,224, filed June 21, 1947, now Patent No. 2,503,180, but it is to be appreciated that other types of vehicles may have the present invention incorporated therein.

An object of the present invention is to provide a sturdy, tilting frame upon which material handling devices may be mounted, and means to operate the tilting frame. For example, the vehicle may be supplied with sets of interchangeable material handling devices whereby a single vehicle may be quickly altered to perform any of the heavy lifting or material handling operations encountered about a factory, lumber yard, granary, farm, construction job, or the like, in order that a single utility vehicle may accomplish work heretofore requiring a number of expensive and complicated vehicles. The invention is of particular value to the small contractor or to a farmer or rancher who can not afford to pay the crews necessary to operate and maintain a fleet of separate vehicles or to purchase the special vehicles.

A further object of the present invention is to simplify the tilting control of a utility vehicle, particularly, but not limited thereto, a utility vehicle having an extendible lift upon which the material handling device is mounted.

A further object of the present invention is to provide means for enabling the changing of a utility vehicle adapted for one form of operation to a utility vehicle adapted for another form of operation rapidly and without the use of special tools.

The foregoing and other objects and advantages of the present invention will be more readily apparent from inspection of the accompanying drawings taken in connection with the following specification wherein like numerals refer to like parts throughout, while the features of novelty will be more distinctly pointed out in the appended claims.

In the drawings

Fig. 1 is a side view of a utility vehicle having the present invention incorporated therein, a portion of the vehicle being broken away to illustrate a part of the invention;

Fig. 2 is a vertical section on an enlarged scale taken substantially along line 2—2 of Fig. 1;

Fig. 3 is a front elevation of a clamping hook forming a part of the construction illustrated in Fig. 1;

Fig. 4 is a side elevation of the part shown in Fig. 3;

Fig. 5 is a side elevation of the tilting frame illustrated in Fig. 1;

Fig. 6 is a rear elevation of the frame shown in Fig. 5;

Fig. 7 is a partial front view of a vehicle and tilting frame having a different form of material handling device associated therewith;

Fig. 8 is a side elevation of a tilting frame having a third form of material handling device associated therewith; and Fig. 9 is a partial front elevation on an enlarged scale of the apparatus illustrated in Fig. 8.

The vehicle herein illustrated is substantially similar to the vehicle described and claimed in my co-pending application, Serial No. 756,224, filed June 21, 1947, now Patent No. 2,503,180, the vehicle comprising a chassis 10 supported upon spaced forward driving wheels 11 and a centrally located single tiller wheel 12 at the rear of the chassis. The chassis is provided with a driver's cab 13 having an access door 14 thereinto and in which controls such as the steering wheel 15 are located. Spaced fenders 16 extend forwardly from the cab over the front wheels 11 and a hood 17 is mounted in the space between the fenders. The hood is provided with a vertical central extension 18 within which a telescoping hydraulic lift (not herein disclosed) is disposed whereby the hood 17 and its appurtenances may be elevated under control of the driver as illustrated and claimed in the aforesaid application. The hood 17 forms a portion of the chassis as herein defined, and other forms of chassis may have some portions of the present invention associated therewith, such as a utility vehicle in which the forward end of the vehicle is provided with vertical tracks upon which a carriage is reciprocated vertically, or a chassis in which the material handling device is not reciprocated vertically but merely tilts.

The present invention comprises a tilting frame 20 including spaced, vertical side members 21 provided by angle bars whose front flanges lie in the same plane and face forwardly of the vehicle. The upper portions of the angle bars 21 are connected by means of a section of pipe 22 welded thereto and carrying perforated ears 23 facing rearwardly therefrom. The rearwardly turned flanges of the angle bars 21 are perforated near their lower edges to receive a horizontally disposed pivot bar 24 maintained by detachable means such as cotter pins 25. The pivot bar 24 is adapted to pass through suitable journals provided in the forward lower extremity of the hood. The lower portion of the frame 20 is provided by a transverse bar preferably comprising an angle bar 26 having a vertical face extending transversely of the frame and spaced therefrom so that the upper and lower edges of the vertical face are free from encumbrances, and preferably having a horizontal leg extending beneath the ends of the bars 21. A bracing means is preferably provided by welding a plate 27 angularly between the inner surfaces of the legs of the angle bar 26, the plate 27 preferably being cut away to receive the lower portions of the bars 21. Bolt receiving openings 28 are preferably provided in the rearwardly extending legs of the upright bars 21.

A cylinder 30 is mounted on some suitable portion of the chassis, in this instance within a housing 31 mounted on top of the hood 17, the cylinder extending along the axis of the vehicle rearwardly of the portion 18. The cylinder contains a movable piston 32 from which rearwardly projects a piston rod 33, the piston being forced rearwardly when fluid under pressure is admitted through an opening 34 in the forward end of the cylinder under control of means (not herein illustrated) such as disclosed in the aforesaid co-pending application. The piston 33 has a crosshead 36 attached thereto which carries an idler sprocket 37 at either end thereof. A roller sprocket chain 38 is extended about each sprocket 37, one end thereof being attached to a bracket 39 on the hood 17 and the other end thereof being attached to one of the ears 23 on the tilting frame. When the piston rod 33 is fully extended the sprocket chains 38 will pull the rocking frame 20 to a substantially upright position, and when fluid is released from the interior of the cylinder any overhanging weight carried by the tilting frame 20 will retract the piston rod to permit the frame to tilt forwardly. Springs 35 are tensioned between the chassis and the crosshead 36 to assure forward tilting of the frame when no objects are supported thereby. A pair of short, curved guides 40 are mounted upon the front, upper edge of the hood 17, the same being of such width as to fit between the side plates of the sprocket chains and engage the rollers thereof so that the chains may extend angularly downwardly about the front of the vehicle as seen in Fig. 7.

The desired type of material handling device is detachably mounted upon the bar 26. Figs. 1 to 4 inclusive illustrate a boom which may be mounted upon the tilting frame. The boom comprises a length of pipe 49 extending centrally forward from a transverse length of pipe 41, the angles therebetween being braced by gusset plates 42. The pipe 41 provides a journal for a pivot rod 43 extending therethrough and receivable in openings 44 in plates 45 extending forwardly in vertical planes from each of a pair of mounting clamps. Each clamp comprises a plate 46 having its upper end bent over to provide a hook 47 adapted to embrace the upper edge of the bar 26, and each plate carries an adjustable J-bolt 48 in its lower end adapted to underlie the lower flange of the bar 26 and hook over the rear edge thereof.

The outer portion of the boom has an ear 50 on its upper surface in which is secured one end of a chain 51, the chain being of such length as to be capable of passing about the bar 22 forming a portion of the tilting frame and back to a keyhole slot in an intermediate ear 53 on the boom 49, the keyhole slot being so arranged as to releasably receive any desired link of the chain so as to hold the boom 49 at any desired angular relation to the frame 20. The forward, lower surface of the boom 49 carries a vertically depending plate 55 in which are provided a plurality of holes 56 for the reception of hooks or the like and keyhole slots 57 for the detachable securement of desired links of chains or the like. By such means slings, ropes, cables or chains may be passed about a heavy object when the frame 20 is tilted forwardly and fastened to the boom, so that when the piston rod 33 is extended to raise the frame 20 to an upright position the boom will lift the object, whereupon the vehicle may be driven to some other locality with the object supported thereby.

In Fig. 7 the frame 20 is illustrated as supporting a scoop including a bucket 60 having a cutting edge 61, the rear portion of the scoop having a transverse spacer bar 62 thereon to which is welded an overhanging bar 63 forming a hook adapted to embrace the upper edge of the bar 26. The upper corners of the bucket are provided with rearwardly extending ears 64 adapted to receive separable pins 65 passed through the openings 28 previously described. The bucket 60 provides means for scooping up and transporting granular or powdered materials, or for excavating operations.

In Figs. 8 and 9 a material handling fork is illustrated, the same comprising a plurality of separate, forwardly extending tines 70 to the rear upper surfaces of which are attached vertical plates 71 whose upper edges are bent rearwardly to provide hooks 72 capable of embracing the upper edge of the bar 26. The tine 70 preferably extends rearwardly from the plate 71 and the vertical height of the plate 71 is such that after the hook 72 is engaged when the tine is disposed angularly upward from its position of use the tine may drop forwardly with the rearwardly extending portion in firm engagement with the lower edge of the bar 26. A plurality of such tines are provided and may be widely spaced as indicated in full line in Fig. 9, or intermediate tines may be added therebetween as shown in dash outline. The shape of the tines herein illustrated is such as intended for lifting crates, boxes, platforms, skids, piles of lumber or the like, but obviously the tines may be modified to perform other operations. Similarly, a number of tines may be connected together to provide hay forks, manure forks or the like, or tines may be connected together to form a platform.

Having illustrated and described preferred embodiments of the invention, it should be apparent to those skilled in the art that the invention permits of modifications in arrangement and detail. I claim as my invention all such modifications as come within the true spirit and scope of the appended claims.

I claim:

1. A utility vehicle comprising a supporting structure, a frame horizontally pivoted near its lower edge upon the forward end of said structure and adapted to be swung from a substantially upright position to a forwardly extending position, extensible means mounted upon said structure and connected to said frame for controlling the position thereof, said frame comprising an angle bar extending transversely of said frame with one leg lying parallel to the plane of said frame and its other leg extending rearwardly and disposed lowermost, said bar being fastened to said frame with the forward and lower surfaces and the upper and lower edges thereof unencumbered, and a material handling device mounted upon said frame and projecting forwardly therefrom, said device comprising a hook portion adapted releasably to engage the forward surface and hook over the upper edge of said one leg of the bar, J-bolts projecting rearwardly from said hook portion and adapted to engage the other leg of said bar, a structural member pivotally mounted on said hook portion and projecting upwardly and outwardly therefrom, and adjustable chain means connecting an upper portion of said structural member to an upper portion of said frame whereby the angular relation of said frame to said structural member may be varied.

2. A utility vehicle comprising a supporting structure, a frame horizontally pivoted near its lower edge upon the forward end of said structure and adapted to be swung from a substantially upright position to a forwardly extending position, extensible means mounted upon said structure and connected to said frame for controlling the position thereof, said frame comprising a bar extending transversely of and lying parallel to the plane of said frame, said bar being fastened to said frame with the forward, upper and lower surfaces thereof unencumbered, and a detachable material handling device mounted upon said frame and projecting forwardly therefrom, said device comprising a plate adapted to rest against the front surface of said bar and said plate having its upper edge bent rearwardly and downwardly to provide a hook portion capable of embracing the upper surface of said bar, a structural member pivotally mounted on said plate and projecting upwardly and outwardly therefrom, and adjustable, elongated, flexible means connecting an upper portion of said structural member to an upper portion of said frame whereby the angular relation of said frame to said structural member may be varied.

3. A utility vehicle comprising a supporting structure, a frame horizontally pivoted near its lower edge upon the forward end of said structure and adapted to be swung from a substantially upright position to a forwardly extending position, extensible means mounted upon said structure and connected to said frame for controlling the position thereof, said frame comprising a bar extending transversely of and lying parallel to the plane of said frame near the lower edge thereof, said bar being fastened to said frame with the forward surface and upper and lower edges thereof unencumbered, and a detachable material handling device mounted upon said frame and projecting forwardly therefrom, said device comprising a plate adapted to rest against the front surface of said bar with said plate having its upper edge bent rearwardly and downwardly to provide a hook portion capable of embracing the upper edge of said bar and a bolt extending rearwardly from the lower portion of said plate and adapted to releasably engage a part of said frame, a structural member pivotally mounted on said plate and projecting upwardly and outwardly therefrom, and adjustable chain means connecting an upper portion of said structural member to an upper portion of said frame whereby the angular relation of said frame to said structural member may be varied.

4. A utility vehicle comprising a supporting structure, a frame horizontally pivoted near its lower edge upon the forward end of said structure and adapted to be swung from a substantially upright position to a forwardly extending position, extensible means mounted upon said structure and connected to said frame for controlling the position thereof, said frame comprising an angle bar having a front face extending transversely of and lying parallel to the plane of said frame near the lower edge thereof and a lower face extending rearwardly beneath the frame, said bar being fastened to said frame with the front and lower faces and the edges thereof unencumbered, and a detachable material handling device mounted upon said frame and projecting forwardly therefrom, said device comprising a plate adapted to rest against the front face of said bar with said plate having its upper edge bent rearwardly and downwardly to provide a hook portion capable of embracing the upper edge of said bar and a J-bolt extending rearwardly from the lower portion of said plate and adapted to releasably engage the rear edge of the lower face of said bar, a structural member pivotally mounted on said plate and projecting upwardly and outwardly therefrom, and adjustably secured chain means connecting an upper portion of said structural member to an upper portion of said frame whereby the angular relation of said frame to said structural member may be varied.

ELMER A. WAGNER.

REFERENCES CITED

The following references are of record in the file of this patent:

UNITED STATES PATENTS

| Number | Name | Date |
|---|---|---|
| 922,450 | Bennett | May 25, 1909 |
| 1,049,697 | Gee | Jan. 7, 1913 |
| 1,619,786 | Anderson | Mar. 1, 1927 |
| 1,796,397 | Remde | Mar. 17, 1931 |
| 2,109,388 | Heller | Feb. 22, 1938 |
| 2,183,478 | Holmes et al. | Dec. 12, 1939 |
| 2,286,947 | Bankson | June 16, 1942 |
| 2,316,760 | Andersen et al. | Apr. 20, 1943 |
| 2,362,220 | Shoemaker | Nov. 7, 1944 |
| 2,401,159 | Hunter | May 28, 1946 |
| 2,412,570 | Ender | Dec. 17, 1946 |
| 2,413,529 | Swaney | Dec. 31, 1946 |
| 2,416,893 | Barker | Mar. 4, 1947 |
| 2,421,472 | Way | June 3, 1947 |
| 2,433,598 | Chadwick, Jr. | Dec. 30, 1947 |
| 2,473,505 | Brock | June 21, 1949 |
| 2,505,639 | Eaton | Apr. 25, 1950 |